OPTICAL COMPUTER COMPRISING SEMICONDUCTOR p-n JUNCTION COMPONENTS

Filed July 24, 1964 Sheet 1 of 2

INVENTOR.
ROGER NEWMAN
BY Robert J. Haase
ATTORNEY

INVENTOR.
ROGER NEWMAN
BY Robert J. Haase
ATTORNEY

United States Patent Office 3,431,438

Patented Mar. 4, 1969

3,431,438
OPTICAL COMPUTER COMPRISING SEMICONDUCTOR P-N JUNCTION COMPONENTS

Roger Newman, Wayland, Mass., assignor to Sperry Rand Corporation, Great Neck, N.Y., a corporation of Delaware Filed July 24, 1964, Ser. No. 384,963
U.S. Cl. 307—312 15 Claims
Int. Cl. H03k 3/42, 19/14, 23/12

ABSTRACT OF THE DISCLOSURE

A solid-state computer component comprising a plurality of diffused coplanar p-n junction elements formed on a semiconductor substrate. One of the junction elements is made optically resonant and is forward-biased to produce laser emission which is directed along the junction plane of another element which is forward-biased below its laser threshold to amplify the laser emission. A third element is biased to detect the amplified emission either by photodetection or laser quenching action.

The present invention generally relates to computers and computer components utilizing light as the medium for data handling, and more particularly, to an all-semiconductor optical computer.

There has been a continuous trend in the design of computers toward ever-increasing computational speed on the one hand and ever-decreasing component size, complexity, power consumption, and cost on the other hand. No single device meeting all of these desiderata has been achieved as yet. Recently, attention has been directed toward computers utilizing optical coupling, for example, computers based upon electroluminescent and photoconductor devices. Although such optically coupled computers lend themselves toward microminiaturization and its attendant advantages, the response time particularly of the photoconductors employed is relatively slow.

Other computer design efforts have been exerted in improving computers utilizing electrical signal carriers. At the present time, however, there appears to be a lag in this trend because the lumped-element components having unshielded wire connections characteristic of electrical signal computers begin to function poorly at frequencies much above about 10 megacycles per second; they become almost inoperative at frequencies above a few hundred megacycles per second. In order to achieve improved operation in the frequency range above about 200 megacycles per second, consideration has been given to the application of microwave components and techniques. This, too, is undesirable because it necessitates the use of bulky waveguide, coaxial cable, or strip line.

The frequency limits on most of the present computer circuit elements which are compatible with microminiaturization techniques lie in the several hundred megacycles per second frequency range or below. For example, the so-called gigacycle transistor still is more a laboratory prototype than a production item despite many years of development work. The prospect of any dramatic change in this situation seems remote. Consequently, a radically new approach to the design of computer components is called for in order to achieve immediate substantial increase in computer operational speed without compromising the size, cost, complexity, and power consumption advantages of existing microminiature components.

It is the principal object of the present invention to provide optical computer circuits and components characterized by operational frequencies in the gigacycle per second frequency range and small size, cost, complexity, and power consumption.

Another object is to provide optical computer circuits and components compatible with monolithic microcircuit production techniques.

An additional object is to provide optical computer circuits and components comprising the same semiconductor material.

These and other objects of the present invention, as will appear from the reading of the following specification, are achieved in a prefrred embodiment by combinations of a basic computer circuit building block comprising a gallium-arsenide laser diode and a monolithic coplanar pair of gallium-arsenide p-n junctions. In a first species of the invention, the junction pair functions as an amplifier of coherent light and as a photodetector, respectively. In a second species of the invention, said junction pair functions as an amplifier of coherent light and as a laser, respectively, the latter being quenched by the coherent light output from the amplifier. Provision is also made in the present invention for the fabrication of the aforementioned devices on a single monolithic block of semiconductor material.

Logical operations are performed by combinations of the first and second species of the invention together with optical transmission line-amplifiers, each of which also comprises a gallium-arsenide p-n junction. By using the optical and electrooptical phenomena which attend the operation of semiconductor diode lasers and p-n junction photodetectors, the speed with which the logic operations are performed is elevated into the gigacycle range at least two orders of magnitude beyond the capability of presently available devices.

For a more complete understanding of the present invention, reference should be had to the following specification and to the figures of which:

FIGURE 1A and 1B are simplified plan and sectional view, respectively of a basic comptuer building block comprising a semiconductor diode laser, a seciconductor diode amplifier and a semiconductor diode photodetector in accordance with a first embodiment of the invention, FIGURES 2A and 2B are simplified plan and sectional views, respectively, of the amplifier-photodetector portion of the embodiment of FIGURES 1A and 1B at a point during its fabrication;

Figures 1A, 1B, 2A, 2B, 3A, 3B:
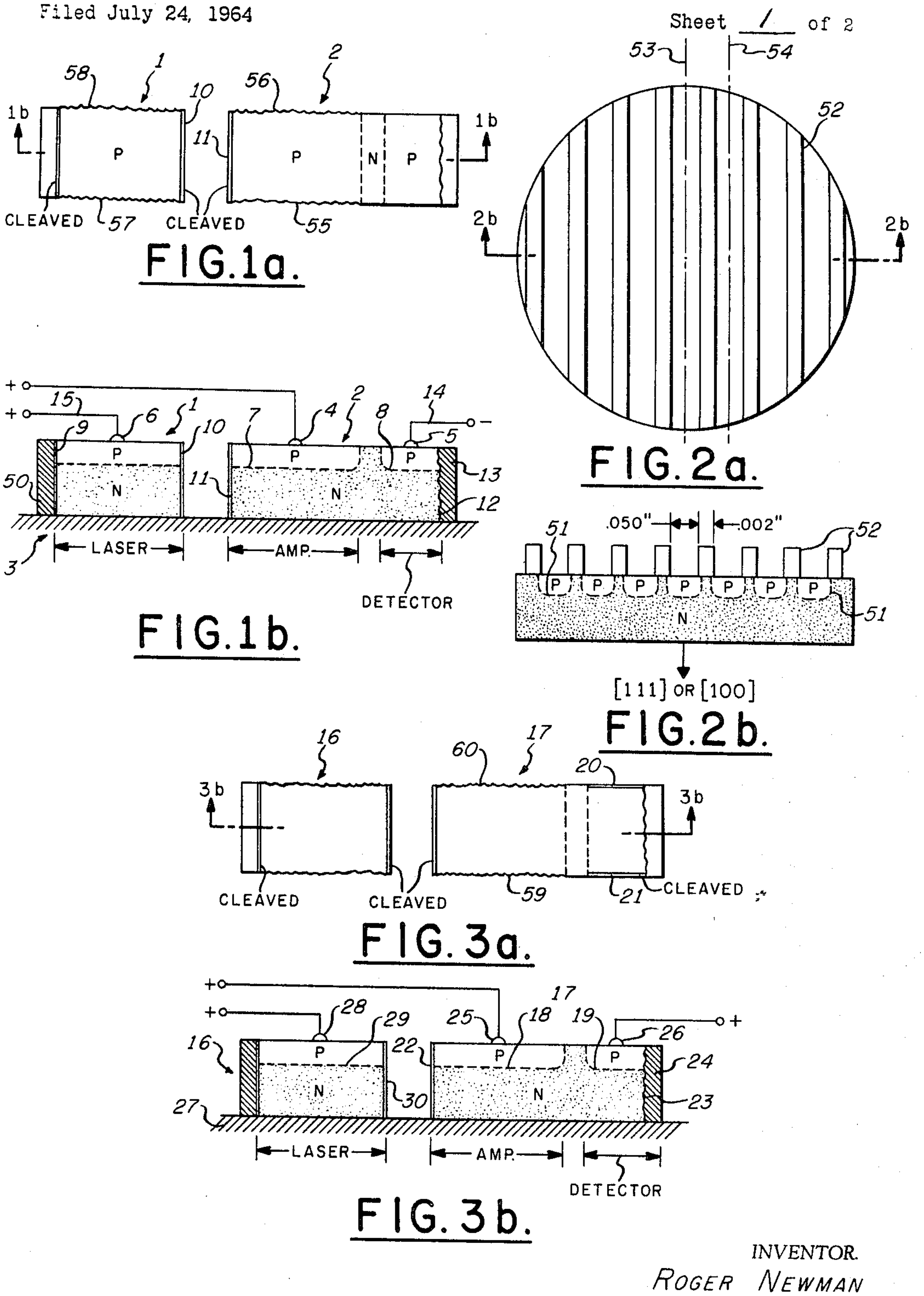
FIGURES 3A and 3B are simplified plan and sectional view, respectively, of a basic computer building block comprising a semiconductor diode laser, a semiconductor diode amplifier and another semiconductor diode laser in accordance with a second embodiment of the invention.

As is now well known, recombination radiation (injection luminescence) produced in a forward biased p-n junction diode provides a mechanism for laser action. If the diode is shaped as a resonant cavity, oscillation at optical wavelengths can be produced at sufficiently high carrier injection levels. Below the oscillation threshold, the incoherent radiation emitted from the diode is more or less isotropically distributed in space and the conversion efficiency of emitted radiation is low. However, once the oscillation threshold is reached, a directed beam of coherent light emerges from the diode having an angular aperture of $\pm 4°$ in the direction transverse to the junction plane and about $\pm 1°$ in the direction parallel to the junction. The intensity of the coherent beam increases superlinearly with injection current over a narrow range of current beyond which the coherent beam intensity becomes a linear function of injection current. In the linear region, the conversion efficiency has been observed to be 40 to 50 times greater than when the diode is operated below lasing threshold.

It is important to note that the ratio of the radiant intensity above lasting threshold to the radiant intensity below lasing threshold is very large; theoretically, the ratio is of the order 1,000 to 1. This very significant binary characteristic (below threshold—"off," above threshold—"on") may be exploited for computer purposes. Only a relatively small fractional current change in the diode forward bias is needed to switch from one of the binory states to the other binary state. Moreover, the switching time of the diode laser between binary states is extremely small. It is computed to be less than $10^{-10}$ second.

The existence of a diode laser presupposes the presence of an amplification process. Recently, experimental evidence has been presented that very large amplification factors are obtainable from nonresonant forward biased gallium-arsenide laser diodes. This is discussed in the paper "Small-Signal Amplification in GaAs Lasers," by J. W. Crowe et al., Applied Physics Letters, vol. 4, No. 3, Feb. 1, 1964, p. 57. As discussed in said paper, the output of a gallium-arsenide diode laser may be coupled into a gallium-arsenide diode amplifier to yield amplified coherent light output. Thus, it can be seen that a binary electrical signal can be converted into a binary optical signal by the use of a diode laser oscillator while optical power gain can be achieved through the use of a nonresonant diode laser amplifier structure. The realization of optical frequency gain is a prerequisite of optical computation because of the need for obtaining "fan-out" in the logic circuits without recourse to amplification techniques at video frequencies. In order to perform logic operations in a computer, however, it is necessary to provide for the detection of the amplified binary optical signal.

Two binary optical signal detectors are provided by the present invention, both of which are fully compatible with microelectronic semiconductor fabrication techniques. One of the detectors utilizes the phenomenon that the oscillation of one diode laser can be quenched by coherent light radiation from a second diode laser if the propagational directions of the radiations of the two diode lasers are noncoincident. The beam from the quenching laser stimulates emission in the second laser in a nonlasing mode and reduces the population inversion in the second laser below the point at which oscillation can be maintained. The result that the beam from the second laser is quenched by radiation from the beam of the quenching laser is interpreted and exploited in the present invention as the accomplishment of optical signal detection. More particularly, it is also the accomplishment of logical inversion, i.e., the output of the quenched laser is the NOT of the output of the quenching laser. It should be noted that the computer building blocks comprising a diode laser, a diode amplifier and a second diode laser to be quenched by the amplified coherent light first output, is fully compatible with microelectronic circuit fabrication techniques. Another type of detector which may be substituted for the quenched diode laser to form a second computer building block which also is compatible with microelectronic circuit fabrication techniques is the reverse-biased p-n junction exhibiting a photovoltaic effect. The reverse-biased junction operates as a photodiode to detect the amplified coherent light output from the diode amplifier.

Before proceeding with a discussion of the manner in which computer logic functions may be performed by combinations of the above-described computer building blocks, the building blocks per se will be described with the aid of the drawings. Referring to FIGS. 1A and 1B, the reference numerals 1 and 2 generally designate a gallium-arsenide laser diode and a monolithic coplanar pair of gallium-arsenide p-n junctions, respectively. It should be noted at the outset that although gallium-arsenide p-n junctions are selected in the described embodiments, other semiconductor p-n junction materials exhibiting injection luminescence and photovoltaic effects also are applicable to the present invention. Semiconductor blocks 1 and 2 are mounted on a common header 3 so that the three p-n junctions comprising the laser, the amplifier and the detector portions are collinear. The amplifier portion of block 2 is nonresonant so that it does not oscillate despite the application of a forward bias to junction 7 via electrode 4 and header 3. The junction 8 of the detector portion of block 2 is reverse-biased by application of a suitable potential to electrode 5 and header 3 to function as a detector of the amplified light from junction 7. The junction of the laser comprising block 1 is forward-biased above the lasing threshold by the application of potential to electrode 6 and header 3.

Blocks 1 and 2 comprise the same semiconductor material and preferably are formed from the same parent wafer which is diffused through the appropriate mask in a conventional manner to form the required junctions. For example, the junctions may be made in n-type gallium-arsenide material by the diffusion of the acceptor impurity zinc. By controlling the diffusion time, the diffusion temperature and the surface concentration of the zinc, the diffusion depth can be conveniently set in the range from about 1 to 100 microns. In general, shallow diffusions give better junction planarity which is necessary for full optical coupling efficiency between the junctions and for establishing low injection current density and stimulated-emission thresholds. It is preferable to produce junctions of the order of 10 microns beneath the diffusion surface. Simply by polishing the gallium-arsenide parent wafer flat, each of the junction planes also will be substantially flat and coplanar with the others. Electrical isolation is established between the two adjacent junctions 7 and 8 within block 2 by the region of n-type gallium-arsenide that extends to the top surface and separates the two junctions 7 and 8 from each other. Junctions 7 and 8 can be biased independently of each other because the p-areas are separated from each other by the back-to-back p-n and n-p junctions (7 and 8) between the two p-areas. An important feature of the invention is that the electrical isolation is achieved in a structure that simultaneously provides for maximum optical coupling efficiency between junctions 7 and 8 directly through the homogenous body of the semiconductor material.

Block 1 is prepared in a conventional manner as a laser diode. Block 2 may be prepared in accordance with the following typical process. For the preparation of block 2, the plane of the parent wafer from which it is derived is made to coincide with either the [111] of the [100] crystallographic planes. The entire surface of the parent wafer is coated with amorphous silicon dioxide by the pyrolytic decomposition of tetraethyl orthosilicate. The silicon dioxide layer then is coated with a layer of photo resist. The photo resist is exposed through a photographic mask consisting of opaque strips about .050" wide which are separated from each other by transparent strips about .002" wide. The strips of the photographic mask are oriented parallel to the [110] crystallographic plane of the parent wafer. The photo resist is developed, and the unexposed photo resist is removed. The exposed resist (corresponding to the transparent strips in the photographic mask) remain on the silicon dioxide and protect it during subsequent chemical etching when the silicon dioxide corresponding to the opaque regions of the mask is removed. Then, the photo resist is removed and the wafer is diffused with zinc to form p-n junctions 51 underneath the parallel silicon dioxide strips 52 as shown in FIGS. 2A and 2B. After the junctions have been formed, the parent wafer is cleaved along [110] crystallographic planes such as planes 53 and 54 to produce wafer strips which, in turn, are cut transversely into individual blocks.

In the case of block 2 of FIGS. 1A and 1B, only cleaved surface 11 is retained. The cleaved surface 12 is roughened by chemical etching and then covered with a silver coating 13. In the case of block 1, however, both of faces 9 and 10 are cleaved and a silver coating 50 is placed over cleaved surface 9. The cleaved surfaces 9 and 10 of block 1 form a resonant optical cavity for laser oscillation. Cleaved surface 11 of block 2 presents a "window" to the coherent light issuing from block 1 to minimize light loss at the air-to-semiconductor interface. The roughening of surface 12 eliminates the possibility that block 2 itself might inadvertently operate in a laser mode along the axis of light propagation. To avoid oscillation along an axis perpendicular thereto, surfaces 55 and 56 also are roughened. The latter precaution is exercised in the case of block 1 by roughening surfaces 57 and 58. The silvered end coatings 9 and 13 tend to maximize the overall efficiency with which the coherent light from block 1 is amplified by junction 7 and detected by junction 8 to produce an electrical output signal on lead 14 in substantially instantaneous response to electrical input excitation on lead 15. The electrical output signal on lead 14 may be applied directly to the input lead of a subsequent basic computer building block corresponding to input lead 15 of the embodiment of FIGURES 1A and 1B. It will be understood that the electrical output signal would trigger the oscillator (diode laser) portion of the next following device either on or off in accordance with the logic which is desired to be accomplished. The need for electrical interconnection between the successive basic computer building blocks is eliminated in the species of the invention represented in FIGURES 3A and 3B by virtue of the fact that the detection of the amplifier coherent light is accomplished by laser quenching rather than by photodetection and its unavoidable conversion of light to electrical energy.

The device of FIGS. 3A and 3B can be fabricated by substantially the same technique employed with the device of FIGURES 1A and 1B. More particularly, block 16 is identical to block 1. Block 17, however, differs somewhat from corresponding block 2 in order that the coplanar pair of p–n junctions 18 and 19 of the block function as a diode junction amplifier and a diode junction laser, respectively. It is preferred that the axis along which the coherent light builds up in the laser portion of block 17 be at right angles to the direction of the amplified light output from junction 18. To this end, it is necessary that surfaces 20 and 21 of block 17 be cleaved as well as surface 22, the latter of which corresponds to cleaved surface 11 in FIGS. 1A and 1B. Inasmuch as surface 22 must be cleaved at right angles to surfaces 20 and 21, it is necessary in the case of the device of FIGS. 3A and 3B that the plane of the parent wafer from which block 17 is cut coincide with the [100] crystallographic plane. Consequently, two mutually perpendicular [110] cleavage planes exist each of which is perpendicular to both the plane of the wafer and to the junctions 18 and 19. Except for the restriction on the orientation on the parent wafer, block 17 is fabricated from the same material and in the same manner as block 2 with the four sides 20, 21, 22, and 23 being cleaved in block 17 as opposed to the two sides 11 and 12 being cleaved in block 2. Side 23 of block 17 is roughened for the same reason discussed in connection with side 12 of block 2 and silver layer 24 is placed on top of the roughened surface. The sides 59 and 60 of the amplifier portion of block 17 abutting the cleaved sides 20 and 21 of the detector (laser) portion also are roughened by etching to insure that the amplifier portion does not operate in a laser mode under the influence of the forward bias applied via electrode 25. A separate forward bias is applied by electrode 26 to junction 19 to institute lasing action along an axis perpendicular to cleaved sides 20 and 21. As in the case of the device of FIGS. 1A and 1B, the electrical return for the biasing potentials is affected through the header 27.

In the operation of the device of FIGS. 3A and 3B, junction 19 normally is biased in a forward direction above lasing threshold to provide a coherent beam of light along an axis perpendicular to cleaved sides 20 and 21. Junction 18 also is biased in a forward direction so as to amplify coherent light penetrating cleaved surface 22 from the laser diode of block 16 when block 16 is caused to oscillate by application of an electrical pulse to electrode 28. Upon the application of an electrical pulse surpassing the lasing threshold of block 16, a beam of coherent light is produced which follows the plane of junction 29, penetrates the two cleaved interfaces 30 and 22, is amplified on passing along junction 18 and impinges upon the detector (laser) portion of block 17. The amplified coherent light causes stimulated emission within said semiconductor material in a nonlasing mode whereby the coherent light normally produced by the laser portion of block 17 is extinguished. It will be recalled that the combination of the first laser diode (block 16) and the amplifier and second laser diode (block 17) constitute an inverter which produces an output (second laser beam) in the absence of an input (electrical input to first laser) but no output in the presence of an input.

Separate laser diode blocks 1 and 16 are represented in the embodiments of FIGS. 1A and 1B, 3A and 3B for the reason that they may be more easily fabricated when they are physically separate from their respective amplifiers and detectors (blocks 2 and 17). A disadvantage of the arrangement is that the coherent light from the laser block must pass through two semiconductor mtaerial-to-air interfaces before reaching the amplifier junction thereby introducing loss which must be overcome by the amplifier. Such a loss can be eliminated by the fabrication of the input laser junction and the amplifier and detector junctions from a single monolithic block of semiconductor material. Some of the possible monolithic configurations are represented in FIGS. 4A, 4B, 5 and 6. In each device of the aforementioned figures, the input laser diode is part of the same monolithic structure in which the amplifier and detector junctions are formed. Only the input laser dode and amplifier junctions are shown for the sake of simplicity. It will be understood, however, that each amplifier junction is optically coupled through the semiconductor body to a respective detector junction as shown in FIGS. 1A, 1B, 3A and 3B.

Figure 4A:
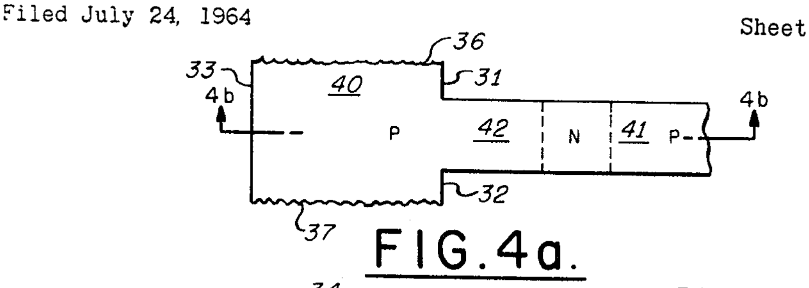
FIGURES 4A, 4B, 5 and 6 are simplified representations of monolithic semiconductor devices containing the semiconductor diode laser and the semiconductor diode amplifier units which are physically separated in the embodiments of FIGURES 1A, 1B, 3A and 3B.
Figure 4B:
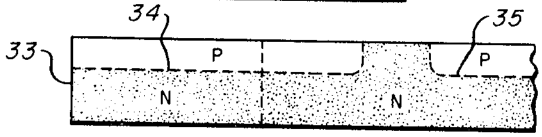

In FIGS. 4A and 4B, a simple Fabry-Perot cavity is provided by cleaving surfaces 31, 32 and 33 of the semiconductor material into which junctions 34 and 35 are diffused following techniques discussed earlier. Sides 36 and 37 are roughened by etching to inhibit unwanted oscillatory modes. The oscillatory region 40 is electrically isolated from the amplifier region 41 by the back-to-back p-n and n-p junctions 34 and 35 without interfering with the direct optical coupling afforded by the intervening crystalline material. The result may be viewed as a resonant cavity oscillator (region 40) which is coupled through an iris (43) to an amplifying transmission line (41).

Figure 5:
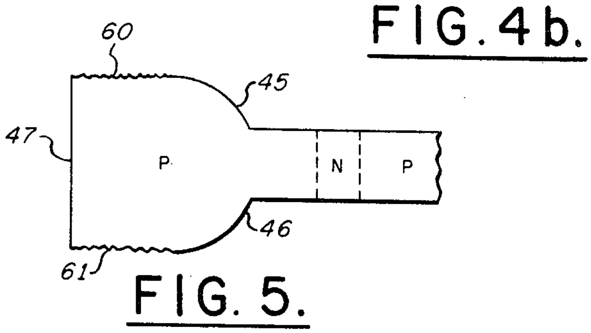
Figure 6:
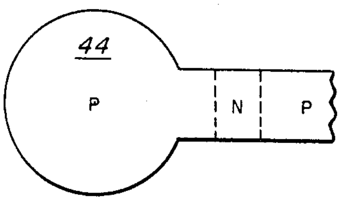

The simple Fabry-Perot cavity of FIGS. 4A and 4B may be replaced by the semiconfocal-cylindrical cavity 43 of FIG. 5 or by the circular-cylindrical cavity 44 of FIG. 6. The semiconfocal cavity is defined on one side by circular reflecting sections 45 and 46 and on the other side by cleaved plane 47. Side portions 60 and 61 are roughened to suppress unwanted oscillatory modes. The circular sides 45 and 46 can be formed by conventional electrolytic etching techniques. The full confocal or circular-cylindrical cavity 44 can be formed in a similar manner by omitting the cleaving and roughening steps which form sides 47, 60 and 61 of cavity 43 of FIG. 5.

Having described the basic logic circuit building blocks, there remains to be considered the optical coupling means whereby the blocks may be grouped into assemblages which function as logic circuits. In accordance with the present invention, the required optical coupling is achieved using shaped and forward-biased p-n junctions which act as distributed amplifier transmission lines. A simple bifurcated optical transmission line amplifier is employed in the optical logic circuit represented in FIGS. 7A and 7B.

The complete logic circuit comprises a pair of input diode lasers 62 and 63 and a single monolithic structure comprising bifurcated optical transmission line-amplifier 64 and detector 65. Detector 65 may take the form either of a reversed-biased photodetector junction such as junction 8 of FIG. 1B or a forward-biased laser junction such as junction 19 of FIG. 3B. The detector junction is electrically isolated but optically coupled to the amplifying junction 66 in the same manner as discussed in connection with FIGS. 1B and 3B. The bifurcated optical transmission line-amplifier 64 differs from the amplifier portions of blocks 2 and 17 of FIGS. 1A and 1B and FIGS. 3A and 3B, only as to shape. The shape is established by conventional electrolytic etching techniques which, incidentally, assures that the walls of the transmission line produced by the etching are characterized by good specular reflection properties. It will be recognized, of course, that different shapes may be required for the optical transmission line-amplifier depending upon the number of sources (lasers) to be coupled to the single detector as determined by the logic function to be performed. It should also be observed that the branching-transmission amplifier also is useful for coupling a single source (laser) to a plurality of detectors.

Figures 7A, 7B:
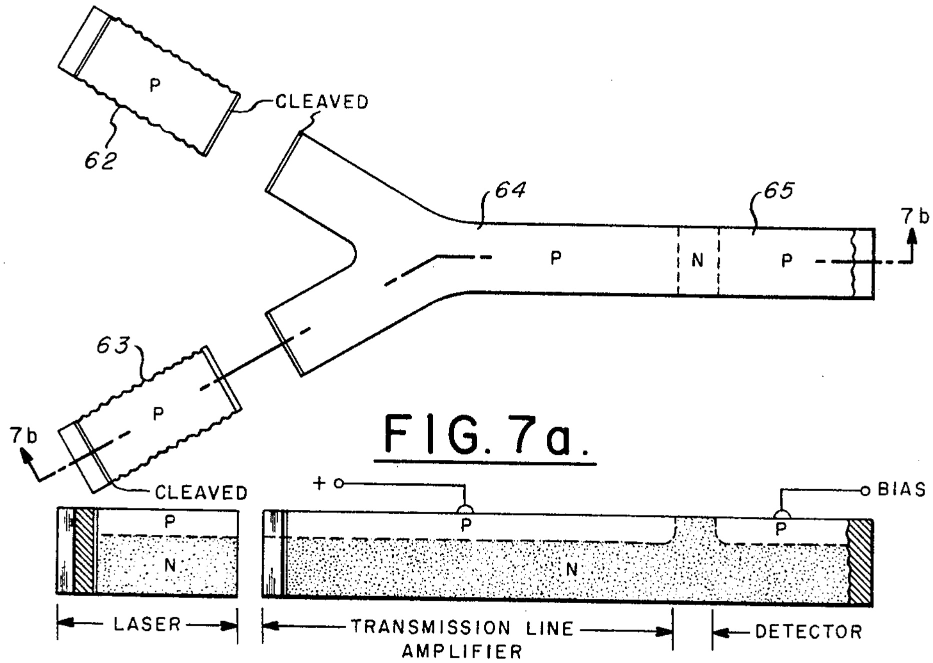
FIGURES 7A and 7B are simplified plan and sectional views, respectively, of a respresentative logic circuit embodiment of the invention.

The way in which computer building blocks such as the building blocks of FIGS. 1A–6 may be combined with the aid of suitable coupling means such as the transmission line-amplifier 64 of FIGS. 7A and 7B are numerous and well understood and will not be repeated here. By way of example only, the device of FIGS. 7A and 7B may be made to function as an AND circuit if detector 65 is a reversed-biased p-n junction. If detector 65 instead is a laser whose coherent light is quenched by the amplified coherent light from coupling means 64, an NOR logical operation may be achieved. Depending upon the level of the forward-biasing potential applied to laser detector 65, the intensity of light derived from lasers 62 and 63 and the gain factor provided by coupling means 64, laser 65 may be quenched upon the oscillation of either laser 62 or laser 63 (NOR) or, alternatively, solely upon the concurrent oscillation of lasers 62 and 63 (AND).

By providing a fourth laser whose coherent light output is quenched by the coherent light from laser detector 65, the fourth laser may be turned on upon the oscillation of laser 62 or laser 63 (OR) or upon the simultaneous oscillation of laser 62 and 63 (AND) depending upon the requirements of the logical design. A significant point with respect to the laser quenching modes of operation is that there is no necessary phase relationship required between the two coherent quenching signals. Quenching operation depends only upon the total power of the optical signals. Thus, there is no necessity for determining the geometric sizes of the optical elements to fractions of an optical wavelength.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical computer component comprising:

first, second and third coplanar p-n junctions exhibiting injection luminescence when forward-biased and photovoltaic effect when reverse-biased, said first junction being provided with an optically resonant cavity, means for pulse forward-biasing said first junction above the lasing threshold thereof to produce a pulsed beam of coherent light along an axis, means for forward-biasing said second junction below the oscillation threshold thereof to amplify said coherent light propagating along said axis, and means for biasing said third junction to detect the amplified coherent light propagating along said axis.

2. An optical computer component comprising:

first, second and third coplanar p-n junctions exhibiting injection luminescence when forward-biased and photovoltaic effect when reverse-biased, each of said first and third junctions being provided with a respective optically resonant cavity, means for pulse forward-biasing said first junction above the lasing threshold thereof to produce a pulsed beam of coherent light along a first axis, means for forward-biasing said third junction above the lasing threshold thereof to produce a beam of coherent light along a second axis perpendicular to said first axis, and means for forward-biasing said second junction below the oscillation threshold thereof to amplify said coherent light propagating along said first axis, the amplified coherent light propagating along said first axis impinging upon said third junction.

3. An optical computer component comprising:

first, second and third coplanar p-n junctions exhibiting luminescence when forward-biased and photovoltaic effect when reverse-biased, said first junction being provided with an optically resonant cavity, means for pulse forward-biasing said first junction above the lasing threshold thereof to produce a pulsed beam of coherent light along an axis, means for forward-biasing said second junction below the oscillation threshold thereof to amplify said coherent light propagating along said axis, and means for reverse-biasing said third junction for operation in a photovoltaic mode in response to the amplified coherent light propagating along said axis.

4. An optical computer component as defined in claim 1 wherein each of said first, second and third junctions is a gallium-arsenide p-n junction.

5. An optical computer component as defined in claim 1 wherein said second and third junctions are formed in a monolithic block of semiconductor material.

6. An optical computer component as defined in claim 5 wherein said semiconductor material is gallium-arsenide.

7. An optical computer component comprising:

a plurality of first junctions, a second junction and a third junction, said junctions being coplanar p-n junctions exhibiting injection luminescence when forward-biased and photovoltaic effect when reverse-biased, each of said first junctions being provided with a respective optically resonant cavity, means for pulse forward-biasing each of said first junctions above the lasing threshold thereof to produce a respective pulsed beam of coherent light, means for forward-biasing said second junction below the oscillation threshold thereof to amplify each said coherent light beam, and means for biasing said third junction to detect the amplified coherent light beams.

8. An optical computer component as defined in claim 7 wherein each of said first, second, and third junctions is a gallium-arsenide p-n junction.

9. An optical computer component as defined in claim 7 wherein said second and third junctions are formed in a monolithic block of semiconductor material.

10. An optical computer component as defined in claim 9 wherein said semiconductor material is gallium-arsenide.

11. An optical computer component comprising:

a plurality of first junctions, a second junction and a third junction, said junctions being coplanar p-n junctions exhibiting injection luminescence when forward-biased and photovoltaic effect when reverse-biased, each of said first junctions being provided with a respective optically resonant cavity, means for pulse forward-biasing each of said first junctions above the lasing threshold thereof to produce a respective pulsed beam of coherent light along a respective first axis, said second junction being furcated in the directions of said respective first axes so as to combine each of the coherent light beams propagating along said respective first axes, means for forward-biasing said second junction below the oscillation threshold thereof to amplify each said coherent light beam propagating along said respective first axes and to redirect the sum thereof along a second axis, and means for biasing said third junction to detect the amplified coherent light beams propagating along said second axis.

12. An optical computer component is defined in claim 11 wherein said second and third junctions are formed in a monolithic block of semiconductor material.

13. An optical computer component comprising:

a plurality of first junctions, a second junction and a third junction, said junctions being coplanar p-n junctions exhibiting injection luminescence when forward-biased and photovoltaic effect when reverse-biased, each of said first and said third junctions being provided with a respective optically resonant cavity, means for pulse forward-biasing each of said first junctions above the lasing threshold thereof to produce a respective pulsed beam of coherent light along a respective first axis, said second junction being furcated in the directions of said respective first axes so as to combine each of the coherent light beams propagating along said first respective axes, means for forward-biasing said second junction below the oscillation threshold thereof to amplify each said coherent light beam propagating along said respective first axes and to redirect the sum thereof along a second axis, and means for forward-biasing said third junction above the lasing threshold thereof to produce a beam of coherent light, the amplified coherent light propagating along said second axis impinging upon said third junction.

14. An optical computer component comprising:

a plurality of first junctions, a second junction and third junction, said junctions being coplanar p-n junctions exhibiting injection luminescence when forward-biased and photovoltaic effect when reverse-biased, each of said first junctions being provided with a respective optically resonant cavity, means for pulse forward-biasing each of said first junctions above the lasing threshold thereof to produce a respective pulse beam of coherent light propagating along a respective first axis, said second junction being furcated in the directions of said respective first axes so as to combine each of the coherent light beams propagating along said respective first axes, means for forward-biasing said second junction below the oscillation threshold thereof to amplify each said coherent light beam propagating along said respective first axes and to redirect the sum thereof along a second axis, and means for reverse-biasing said third junction for operation in a photovoltaic mode in response to the amplified coherent light propagating along said second axis.

15. An optical computer component comprising:

first, second, and third coplanar p-n junctions exhibiting injection luminescence when forward-biased and photovoltaic effect when reverse-biased, each of said first and third junctions being provided with a respective optically resonant cavity, means for pulse forward-biasing said first junction above the lasing threshold thereof to produce a pulsed beam of coherent light along an axis, means for forward-biasing said third junction above the lasing threshold thereof to produce a beam of coherent light, and means for forward-biasing said second junction below the oscillation threshold thereof to amplify said coherent light propagating along said axis, the amplified coherent light propagating along said axis impinging upon said third junction.

References Cited

UNITED STATES PATENTS 3,257,626 1/1966 Marinace et al. ______ 331—94.5

JEWELL H. PEDERSEN, *Primary Examiner.*

W. L. SIKES, *Assistant Examiner.*

U.S. Cl. X.R.

331—94.5